United States Patent [19]

Fukui

[11] Patent Number: 5,305,722
[45] Date of Patent: Apr. 26, 1994

[54] KNOCK SUPPRESSION APPARATUS FOR AN INTERNAL COMBUSTION ENGINE

[75] Inventor: Wataru Fukui, Himeji, Japan

[73] Assignee: Mitsubishi Denki Kabushiki Kaisha, Tokyo, Japan

[21] Appl. No.: 78,854

[22] Filed: Jun. 21, 1993

[30] Foreign Application Priority Data

Jun. 30, 1992 [JP] Japan .................................. 4-172835

[51] Int. Cl.⁵ ........................................... F02P 5/145
[52] U.S. Cl. ................................................. 123/425
[58] Field of Search ........................... 123/425, 435

[56] References Cited

U.S. PATENT DOCUMENTS

| | | | |
|---|---|---|---|
| 4,356,551 | 10/1982 | Iwase et al. | 123/425 X |
| 4,709,678 | 12/1987 | Yagi et al. | 123/425 |
| 4,741,310 | 5/1988 | Yagi et al. | 123/425 |
| 4,788,957 | 12/1988 | Komurasaki | 123/425 |
| 4,875,450 | 10/1989 | Yoshikawa et al. | 123/425 |
| 5,109,820 | 5/1992 | Iwata et al. | 123/425 |
| 5,144,929 | 9/1992 | Hosoya et al. | 123/425 |

*Primary Examiner*—Willis R. Wolfe
*Attorney, Agent, or Firm*—Sughrue, Mion, Zinn, Macpeak & Seas

[57] ABSTRACT

A knock suppression apparatus for an internal combustion engine includes a peak value sensor that senses a peak value of a knock signal indicating knocking of an engine. An analog-digital converter repeatedly converts the peak value into a digital value at prescribed intervals. The most recent digital peak value from the analog-digital converter is stored in a memory and used by a lag angle calculator to calculate a lag angle for suppressing knocking. The ignition timing of the engine is controlled according to a basic ignition timing and the lag angle. Because the analog-digital converter is constantly performing conversion, the ignition timing can be immediately adjusted to compensate for knocking.

8 Claims, 2 Drawing Sheets

KNOCK SUPPRESSION APPARATUS FOR AN INTERNAL COMBUSTION ENGINE

BACKGROUND OF THE INVENTION

This invention relates to a knock suppression apparatus for an internal combustion engine, such as a multi-cylinder automotive engine.

Engine knocking is a form of abnormal engine vibration which occurs when the ignition timing of an internal combustion engine is unsuitable for the current operating conditions of the engine. The occurrence of knocking in an engine not only decreases the ride comfort and worsens the fuel economy of the vehicle in which the engine is installed, but it can also damage the engine. Therefore, automotive engines are typically equipped with knock suppression apparatuses which detect the occurrence of knocking and then adjust the ignition timing in the lag angle direction until the knocking stops.

With a conventional knock suppression device, when knocking is detected during the power stroke of cylinder number n in the firing order of an engine, the processing time of the knock suppression apparatus is such that there is insufficient time to adjust the ignition timing for the next cylinder (cylinder n+1) in the firing order to compensate for knocking, especially at high engine speeds, and the earliest cylinder for which the ignition timing can be adjusted is cylinder number (n+2) in the firing order. In other words, there is always a lag of one cylinder after knocking is sensed before the ignition timing can be adjusted to compensate for knocking. Accordingly, there is a need for a knock suppression device with a faster response time.

SUMMARY OF THE INVENTION

It is an object of the present invention to provide a knock suppression apparatus for an internal combustion engine having a faster response than a conventional knock suppression apparatus and which can immediately adjust the ignition timing of the engine when knocking is sensed.

It is another object of the present invention to provide a knock suppression method for an internal combustion engine.

A knock suppression apparatus for an internal combustion engine according to the present invention includes knock sensing means for generating an electrical knock signal indicative of the occurrence of knocking in an engine. A peak value sensor senses a peak value of the knock signal and generates an analog peak value signal indicative of the peak value. An analog to digital converter connected to the peak value sensor converts the peak value signal into a digital signal at first intervals. A lag angle calculating means calculates at second intervals larger than the first intervals a lag angle based on the most recent digital value generated by the converter. A basic ignition timing calculating means calculates a basic ignition timing based on an operating condition of the engine, and a final ignition timing calculating means calculates a final ignition timing based on the basic ignition timing and the lag angle.

A knock suppression method for an internal combustion engine includes sensing knocking of an engine and generating a knock signal indicative of the level of knocking. A peak value of the knock signal is determined and an analog peak value signal indicating the peak value is generated. Analog to digital conversion of the peak value signal is performed at first intervals to generate a digital signal. A basic ignition timing for the engine is calculated based on an operating condition of the engine. A lag angle for adjusting the ignition timing is calculated at second intervals larger than the first intervals based on the most recent digital signal, and a final ignition timing for the engine is calculated based on the basic ignition timing and the lag angle.

In the present invention, because analog to digital conversion of a peak value signal is performed at smaller intervals than a lag angle is calculated, the conversion can be completed before lag angle calculation is to take place. Thus, the time required to calculate the ignition timing can be shortened by the time necessary to perform the analog to digital conversion, and this makes it possible to adjust the ignition timing to compensate for knocking immediately after knocking is sensed in a cylinder of an engine.

DESCRIPTION OF THE PREFERRED EMBODIMENTS

Figure 1:
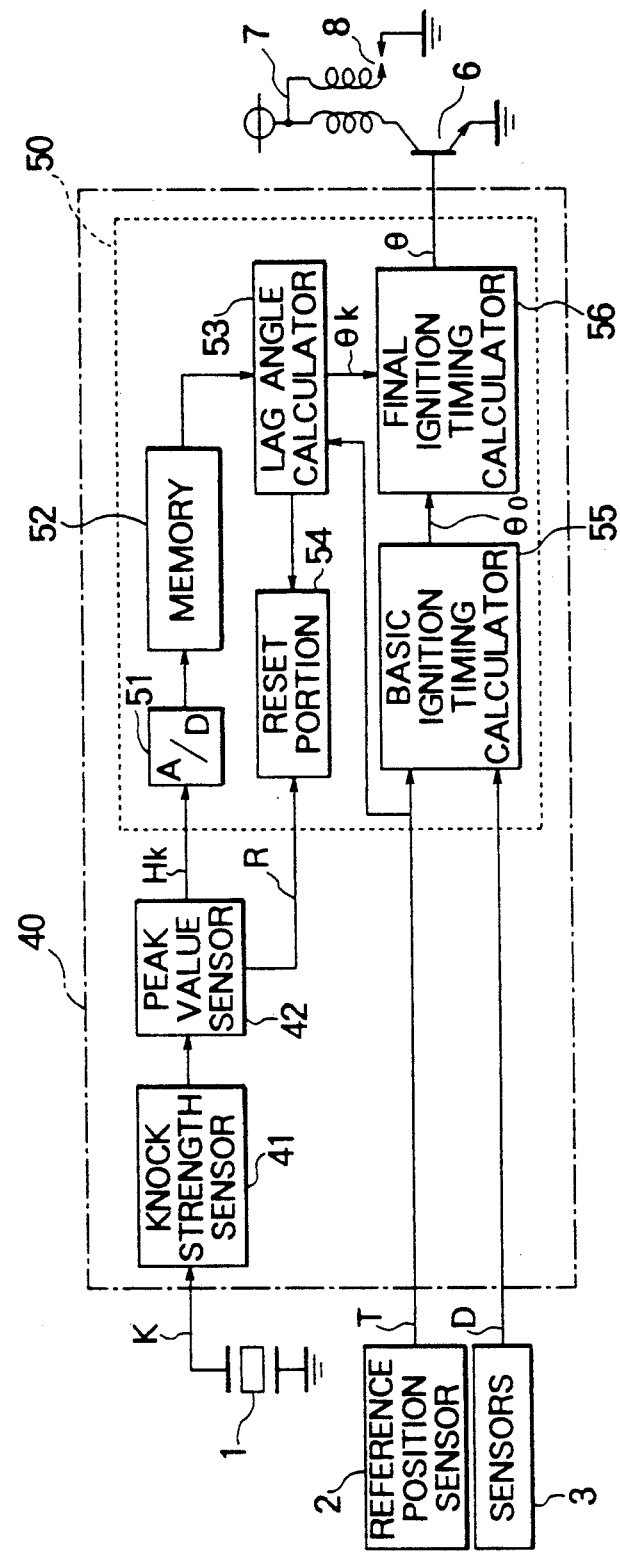
FIG. 1 is a block diagram of an embodiment of a knock suppression apparatus according to the present invention.

A preferred embodiment of a knock suppression apparatus according to the present invention will now be described while referring to the accompanying drawings. FIG. 1 is a block diagram conceptually illustrating the structure of this embodiment as applied to an unillustrated multi-cylinder internal combustion engine, such as an automotive engine. Knocking of the engine is sensed by one or more conventional knock sensors 1 mounted on the engine. In the present embodiment, the knock sensor 1 is a device such as an accelerometer which generates a knock signal K indicating mechanical vibrations of the engine. Alternatively, the knock sensor 1 could be a device which senses the pressures within the cylinders of the engine. The knock signal K from the knock sensor 1 is input to an electronic controller 40, such as a microcomputer.

Figure 2:
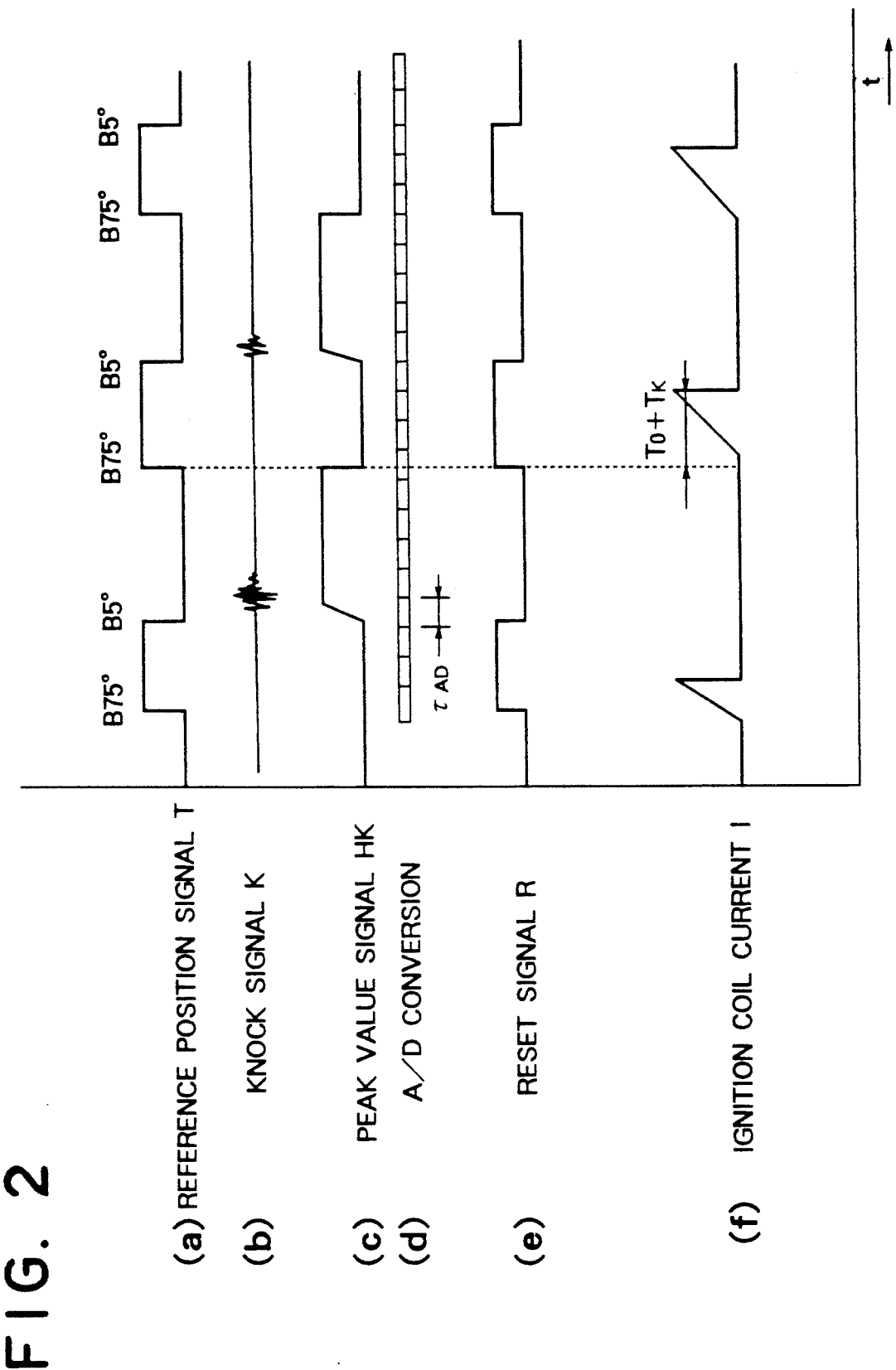
FIGS. 2(a)-(f) are a wave form diagram of signals generated during the operation of the embodiment of FIG. 1.

A reference position sensor 2 generates a reference position signal T indicating each time any piston of the engine is at a prescribed position with respect to top dead center. Line (a) of FIG. 2 illustrates an example of the reference position signal T. In the present embodiment, it comprises a string of pulses, each pulse having a rising edge at a first reference position, such as 75° BTDC, and a falling edge at a second reference position, such as 5° BTDC. The values of the first and second reference positions are not critical, and can be different from the values used in this embodiment. Sensors for generating a reference position signal of this type are well known in the art. For example, the reference position sensor 2 can be a conventional sensor for sensing the rotation of the crankshaft or the camshaft of the engine. The reference position signal T is input to the controller 40.

One or more conventional sensors 2 detect various operating conditions of the engine and provide the controller 40 with corresponding operating condition signals D indicating the sensed operating conditions. The operating conditions can be any conditions typically used in determining the ignition timing of an engine, such as the load on the engine. The load can be determined by various methods using conventional sensors, such as by sensing the degree of opening of a throttle valve for the engine or by sensing the air flow rate into the engine.

Based on the input signals from sensors 1-3, the controller 40 controls the ignition timing of the engine. The controller 40 includes a knock strength sensor 41 that senses the level of the knock signal K during a given time period. A peak value sensor 42 generates a peak value signal Hk indicating the peak value of the voltage of the knock signal K. The peak value sensor 42 can be a conventional peak hold circuit, or it can be an integrating circuit, for example. The peak value signal Hk remains constant until the voltage of the knock signal K rises to a new peak value or the peak value sensor 42 is reset. The signals T and D from sensors 2 and 3, respectively, and the peak value signal Hk are provided to a timing control portion 50 within the controller 40.

The timing control portion 50 includes an A/D (analog to digital) converter 51 which receives the peak value signal Hk and repeatedly perform analog to digital conversion at prescribed time intervals. The length of the intervals, $\tau_{AD}$, is preferably as small as possible, and can be on the order of the time required (generally several tens of microseconds) for the A/D converter 51 to perform an A/D conversion of the peak value signal Hk. The digital value of the peak value signal Hk is input to a memory 52, which stores the most recent value generated by the A/D converter 51. In the present embodiment, the length $\tau_{AD}$ is smaller than the period of the first or second reference positions so that A/D conversion can be performed a plurality of times during the interval between consecutive occurrences of the first reference position or during the intervals between consecutive occurrences of the second reference position.

A basic ignition timing calculator 55 calculates a basic ignition timing $\Theta_0$ for the engine based on the present operating conditions of the engine, such as the engine rotational speed, which is indicated by the reference position signal T, and other engine operating conditions indicated by the operating condition signals D. The basic ignition timing $\Theta_0$ indicates the number of degrees of crankshaft rotation from the occurrence of one of the reference positions to the crankshaft angle at which ignition is to take place in a cylinder of the engine. Algorithms for use in calculating a basic ignition timing $\Theta_0$ are well known in the art, and any suitable algorithm can be employed. Typically, the basic ignition timing calculator 55 determines the basic ignition timing $\Theta_0$ by referring to a memory map in which are stored values of the basic ignition timing $\Theta_0$ as a function of various operating parameters of the engine.

The memory 52 is connected to a lag angle calculator 53, which operates in response to the reference position signal T. At an occurrence of one of the reference positions as indicated by the reference position signal T, the lag angle calculator 53 reads in the most recent value of the digitalized peak value signal Hk stored in the memory 52 and compares it with a predetermined level to calculate a lag angle $\Theta_k$ for use in retarding the basic ignition timing $\Theta_0$ in order to suppress knocking.

The value of the lag angle $\Theta_k$ will depend on the value of the peak value signal Hk stored in the memory 52. When knocking is not taking place, the peak value signal Hk is 0 and will be less than the predetermined level, so the lag angle calculator 53 sets the lag angle $\Theta_k$ to 0. When the value of the peak hold signal Hk in the memory 53 is above the predetermined value indicating that knocking is taking place, the lag angle calculator 53 sets the lag angle $\Theta_k$ to a nonzero value, such as 3° of crankshaft rotation.

The basic ignition timing $\Theta_0$ and the lag angle $\Theta_k$ are provided to a final ignition timing calculator 56, which calculates a final ignition timing $\Theta$ according to the formula $$\Theta = \Theta_0 + \Theta_k.$$

The final ignition timing calculator 56 then switches a drive transistor 6 connected to the primary winding of an ignition coil 7 for the engine in accordance with the final ignition timing $\Theta$. Namely, when a length of time corresponding to the final ignition timing $\Theta$ has elapsed since the occurrence of one of the reference positions, the primary current of the ignition coil 7 is cut off by the drive transistor 6, and a spark plug 8 connected to the secondary winding of the ignition coil 7 is made to fire. Thus, when knocking is not taking place and the lag angle $\Theta_k$ is zero, the final ignition timing $\Theta$ is equal to the basic ignition timing $\Theta_0$, and when knocking is taking place and the lag angle $\Theta_k$ has a nonzero value, the final ignition timing $\Theta$ will be larger than the basic ignition timing $\Theta_0$, and the ignition of the engine is retarded with respect to the basic ignition timing $\Theta_0$.

Upon the completion of reading in information from the memory 52, the lag angle calculator 53 provides a control signal to a reset portion 54, which generates a reset signal R for the peak value sensor 42 which causes the peak value signal Hk to be reset to 0.

If the value of the lag angle $\Theta_k$ is not sufficient to suppress knocking and a knock signal K of at least a prescribed level continues to be generated the lag angle calculator 53 will further increase the lag angle $\Theta_k$ in steps until the knocking is suppressed. However, if the lag angle $\Theta_k$ reaches approximately 10°, it is determined that mistaken sensing of knocking is taking place, and no further increases in the lag angle $\Theta_k$ are made, even if the knock signal K continues to be of a level indicative of knocking.

If the knocking is suppressed by retarding the ignition timing and the knock signal K falls to a level below that indicative of knocking, the lag angle calculator 53 decreases the lag angle $\Theta_k$ towards zero and the final ignition timing $\Theta$ is returned towards the basic ignition timing $\Theta_0$.

The operation of this embodiment will be described in further detail while referring to the wave form diagram in FIG. 2. Line (a) shows the reference position signal T generated by the reference position sensor 2. When the engine is undergoing knocking, the knock sensor 1 generates a knock signal K as shown by line (b). The peak value of the knock signal K is indicated by the peak value signal Hk shown in line (c), which increases as the magnitude of the knock signal K increases and then levels off when the knock signal K has reached a maximum value. The knock signal K is shown as having a zero value prior to the occurrence of knocking, but the knock sensor 1 may also sense engine vibrations due to sources other than engine knocking and may have a nonzero value even when knocking is not taking place. Therefore, in order to prevent such vibrations from being mistaken for engine knock, during a time period in which knocking is unlikely to take place, the reset signal for the peak value sensor 42 is maintained high, as shown by line (e), and during this period the peak value sensor 42 is maintained at zero. When any piston of the engine reaches a position in which there is the possibility of knocking taking place, the reset signal is returned to zero so that the peak value sensor 42 can generate an output signal. Since knocking is most likely to occur after the second reference position at 5° BTDC, in this embodiment, the reset signal R has a high level from the first reference position at 75° BTDC until the second reference position at 5° BTDC for each cylinder and then returns to a low level.

As shown by line (d), the A/D converter 51 is continuously performing A/D conversion of the peak value signal Hk at intervals of $\tau_{AD}$, and the digital value of the peak value signal Hk is stored in the memory 52. At an occurrence of the first reference position at 75° BTDC, the lag angle calculator 53 reads in the most recent digital value of the peak value signal Hk from the memory 52 and calculates a corresponding lag angle $\Theta_k$. Upon the completion of reading in the peak value signal Hk, the lag angle calculator 53 generates a command to the reset portion 54 to generate a reset signal R. The time required by the lag angle calculator 53 to read in the peak value signal Hk from the memory 52 is approximately 2 microseconds. Also at the occurrence of the first reference position, the basic ignition timing calculator 55 calculates the basic ignition timing $\Theta_0$, and then the final ignition timing calculator 56 calculates the final ignition timing $\Theta$ based on the basic ignition timing $\Theta_0$ and the lag angle $\Theta_k$. As shown in line (f), the current I in the primary winding of the ignition coil 7 is then controlled so as to be cut off at a time $T_0+T_k$, wherein $T_0$ corresponds to the basic ignition timing $\Theta_0$ and $T_k$ corresponds to the lag angle $\Theta_k$.

In a conventional knock suppression apparatus, a peak value signal does not undergo A/D conversion until the occurrence of the first reference position, and when the ignition timing is measured from the first reference position, there is not sufficient time to adjust the ignition timing for the immediately following cylinder in the engine firing order to compensate for knocking.

However, in the present invention, the peak value signal Hk is continuously undergoing A/D conversion and the digital value of the peak value signal Hk is being stored in memory 52. Accordingly, when knocking is sensed during the power stroke of any cylinder of the engine, there is enough time to adjust the ignition timing for the immediately following cylinder in the firing order to compensate for the knocking. Therefore, the lag time of one cylinder in correcting the ignition timing which is inherent in conventional knock suppression apparatus does not occur in the present invention, so its response time is greatly improved. As a result, knocking can be suppressed more rapidly, and the engine can run more efficiently with less chance of damage due to knocking.

What is claimed is:

1. A knock suppression apparatus for a internal combustion engine comprising:

knock sensing means for generating an electrical knock signal indicative of the occurrence of knocking in an engine;

peak value sensor for sensing a peak value of the knock signal and generating an analog peak value signal indicative of the peak value;

an analog to digital converter connected to the peak value sensor for converting the peak value signal into a digital signal at first intervals;

lag angle calculating means for calculating at second intervals larger than the first intervals a lag angle based on the most recent digital signal generated by the converter;

basic ignition timing calculating means for calculating a basic ignition timing based on an operating condition of the engine; and final ignition timing calculating means for calculating a final ignition timing based on the basic ignition timing and the lag angle.

2. An apparatus as claimed in claim 1 comprising a memory connected to the converter for storing a digital value corresponding to the most recent digital signal generated by the converter, wherein the lag angle calculating means reads the digital value from the memory at the second intervals.

3. An apparatus as claimed in claim 2 comprising resetting means for resetting the peak value signal generated by the peak value sensor to zero when the lag angle calculating means finishes reading the digital value from the memory.

4. An apparatus as claimed in claim 1 wherein the length of the first interval is such that the converter converts the peak value signal a plurality of times during each of the second intervals.

5. An apparatus as claimed in claim 1 including means for controlling the engine according to the final ignition timing.

6. An apparatus as claimed in claim 1 comprising a position sensing means for sensing rotation of the engine and generating a reference position signal indicating each time a piston of the engine is at a first reference position, wherein the lag angle calculating means calculates the lag angle each time the reference position signal indicates an occurrence of the first reference position.

7. A knock suppression method for an internal combustion engine comprising:

sensing knocking of an engine and generating a knock signal indicative of the level of knocking;

determining a peak value of the knock signal and generating an analog peak value signal indicating the peak value;

performing analog to digital conversion of the peak value signal at first intervals to generate a digital signal;

calculating a basic ignition timing for the engine based on an operating condition of the engine;

calculating a lag angle at second intervals larger than the first intervals based on the most recent digital signal; and calculating a final ignition timing for the engine based on the basic ignition timing and the lag angle.

8. A method as claimed in claim 7 comprising performing the analog to digital conversion a plurality of times during each of the second intervals.

* * * * *